United States Patent
Kakande (10) Patent No.: US 9,756,407 B2
(45) Date of Patent: Sep. 5, 2017

(54) NETWORK EMPLOYING MULTI-ENDPOINT OPTICAL TRANSCEIVERS

(71) Applicant: Alcatel-Lucent USA Inc., Murray Hill, NJ (US)

(72) Inventor: Joseph K. Kakande, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 88 days.

(21) Appl. No.: 14/872,825

(22) Filed: Oct. 1, 2015

(65) Prior Publication Data

US 2017/0099532 A1 Apr. 6, 2017

(51) Int. Cl.
*H04J 14/00* (2006.01)
*H04Q 11/00* (2006.01)
*H04L 12/707* (2013.01)
*H04L 12/931* (2013.01)

(52) U.S. Cl.
CPC .......... *H04Q 11/0066* (2013.01); *H04L 45/24* (2013.01); *H04L 49/65* (2013.01); *H04Q 2011/0058* (2013.01); *H04Q 2011/0073* (2013.01)

(58) Field of Classification Search
CPC ....... H04Q 11/0066; H04Q 2011/0073; H04Q 2011/0058; H04L 45/24; H04L 49/65
USPC ........................................................... 398/45
See application file for complete search history.

(56) References Cited

U.S. PATENT DOCUMENTS

| 6,963,575 | B1 | 11/2005 | Sistanizadeh et al. |
| 7,643,468 | B1 | 1/2010 | Arregoces et al. |
| 7,835,265 | B2 | 11/2010 | Wang et al. |
| 8,654,630 | B2 | 2/2014 | Lei et al. |
| 9,008,510 | B1 * | 4/2015 | Zhao .................. H04Q 11/0005 370/244 |
| 9,031,406 | B2 * | 5/2015 | Hui ....................... H04J 14/022 398/50 |
| 9,462,359 | B2 * | 10/2016 | Mehrvar ............ H04Q 11/0005 |

(Continued)

OTHER PUBLICATIONS

Farrington, Nathan, et al. "Helios: a hybrid electrical/optical switch architecture for modular data centers." ACM SIGCOMM Computer Communication Review 40.4 (2010): 339-350.

(Continued)

*Primary Examiner* — Juan A Torres
(74) *Attorney, Agent, or Firm* — Mendelsohn Dunleavy, P.C.; Yuri Gruzdkov (57) ABSTRACT

A communication network that employs a plurality of multi-endpoint (MEP) optical transceivers in a leaf (or functionally similar) layer thereof. The use of MEP optical transceivers enables the communication network to support a pair of parallel paths for any source/destination pair of network nodes. In an example configuration, data packets that flow through one of the parallel paths go from the source node to the destination node via an electronic packet switch in the network's spine layer. Data packets that flow through another one of the parallel paths go from the source node to the destination node via an optical cross-connect switch. In operation, a network controller may dynamically select which one of the parallel paths to enable for each particular source/destination pair of network nodes, with the selection being made, e.g., based on the data volume to be transmitted between the two nodes.

20 Claims, 8 Drawing Sheets

(56) References Cited

U.S. PATENT DOCUMENTS

| | | |
|---|---|---|
| 2010/0020806 A1 | 1/2010 | Vahdat et al. |
| 2012/0195591 A1* | 8/2012 | Benner ............... H04L 12/4641 398/45 |
| 2012/0321309 A1 | 12/2012 | Barry et al. |
| 2014/0140689 A1 | 5/2014 | Dahlfort et al. |
| 2014/0334819 A1* | 11/2014 | Mehrvar ............ H04Q 11/0003 398/51 |

OTHER PUBLICATIONS

Kakande, J., "Multiple Endpoint Optical Transmitter Cross Reference to Related Application," U.S. Appl. No. 14/728,915, filed Jun. 2, 2015, 32 pages.

Kakande, J., "Multiple Endpoint Optical Receiver Cross Reference to Related Application," U.S. Appl. No. 14/728,919, filed Jun. 2, 2015, 29 pages.

Kakande, J., "Network Switch Employing One or More Multi-Endpoint Optical Transceivers," U.S. Appl. No. 14/872,837, filed Oct. 1, 2015, 30 pages.

Liu, Y., et al. "A Survey of Datacenter Network Architectures," Springer Book Brief 2013, pp. 1-22.

Bazzaz, H., et al. "Switching the optical divide: Fundamental challenges for hybrid electrical/optical datacenter networks." Proceedings of the 2nd ACM Symposium on Cloud Computing. ACM, 2011.

Saha, S., et al. "HyScaleII: A high performance hybrid optical network architecture for data centers." Sarnoff Symposium (SARNOFF), 2012 35th IEEE. IEEE, 2012.

Bilal, Kashif, et al. "A taxonomy and survey on green data center networks." Future Generation Computer Systems 36 (2014): 189-208.

Xia, Kang, et al. "Petabit optical switch for data center networks." Polytechnic Institute of New York University, New York, Tech. Rep (2010).

* cited by examiner

NETWORK EMPLOYING MULTI-ENDPOINT OPTICAL TRANSCEIVERS

BACKGROUND

Field

The present disclosure relates to optical communication equipment and, more specifically but not exclusively, to a network employing multi-endpoint (MEP) optical transceivers and to methods for configuring and operating the same.

Description of the Related Art

This section introduces aspects that may help facilitate a better understanding of the disclosure. Accordingly, the statements of this section are to be read in this light and are not to be understood as admissions about what is in the prior art or what is not in the prior art.

In a hybrid packet/circuit-switched network, optical circuit switches may be installed to augment electrical packet-based switching. Network management scripts or software-defined networking (SDN) may then be used to dynamically (re)direct data flows either through the packet-switched portion or through the circuit-switched portion of the network. One possible use of hybrid packet/circuit-switched networks is in the field of data centers, which is growing in importance, for example, due to the crucial role of data centers in supporting various Internet-based applications, such as cloud computing and storage, search, video content hosting and distribution, social networking, etc. Since the underlying network has a significant impact on the agility and re-configurability of the data center infrastructure, design of suitable network architectures for data centers is currently an active area of research and development.

SUMMARY OF SOME SPECIFIC EMBODIMENTS

Disclosed herein are various embodiments of a communication network that employs a plurality of multi-endpoint (MEP) optical transceivers in a leaf (or functionally similar) layer thereof. The use of MEP optical transceivers enables the communication network to support at least one pair of parallel paths for any source/destination pair of network nodes. In an example routing configuration, data packets that flow through one of the parallel paths go from the source node to an ingress port of an electronic packet switch (EPS) in the network's spine layer, transit the EPS switch fabric, and are delivered to the destination node through an egress port of the electronic packet switch. Data packets that flow through another one of the parallel paths go from the source node to an ingress port of an optical cross-connect (OXC) switch, and are delivered to the destination node through an egress port of the OXC switch. In operation, a network controller may dynamically select which one of the parallel paths to enable for each particular source/destination pair of network nodes, with the selection being made, e.g., based on the data volume to be transmitted between the two nodes.

Some embodiments of the communication network disclosed herein may be used to implement a data center.

Some embodiments of the communication network disclosed herein may advantageously be used to alleviate problems associated with possible overflow of network and switch buffers caused by a simultaneous presence in the network of "elephant" and "mice" flows.

According to one embodiment, provided is an apparatus comprising: a plurality of MEP optical transceivers, each optically coupled to a respective optical path of a first plurality of optical paths and to a respective optical path of a second plurality of optical paths; a first-layer electronic packet switch coupled to the plurality of MEP optical transceivers via the first plurality of optical paths; and an optical cross-connect switch coupled to the plurality of MEP optical transceivers via the second plurality of optical paths. The apparatus is configured to transmit data from any one of the MEP optical transceivers to any other of the MEP optical transceivers via a respective communication link that is configurable to include a selected one of the first-layer electronic packet switch and the optical cross-connect switch.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Certain embodiments disclosed herein may benefit from the use of methods and apparatus disclosed in U.S. patent application Ser. No. 14/872,837, by Joseph Kakande, filed on the same date as the present application, which is incorporated herein by reference in its entirety.

Figure 1:
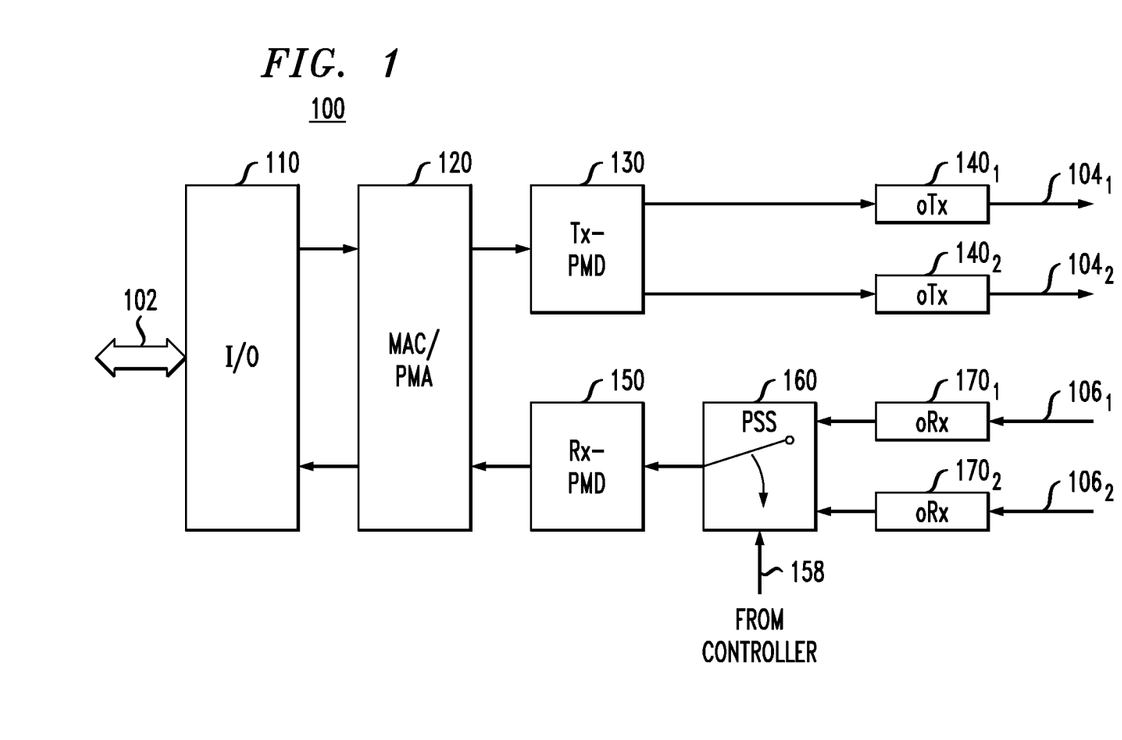
FIG. 1 shows a block diagram of a dual-endpoint transceiver that can be used in various embodiments disclosed herein.

FIG. 1 shows a block diagram of a dual-endpoint (DEP) optical transceiver 100 that can be used in various embodiments of the communication systems disclosed herein. From the provided description, a person of ordinary skill in the art will understand that DEP optical transceiver 100 is an example of a multi-endpoint (MEP) optical transceiver that can be used in alternative embodiments instead of or in addition to DEP optical transceiver 100. Various additional embodiments of DEP optical transmitters, DEP optical receivers, MEP optical transmitters, and MEP optical receivers that can be employed in alternative embodiments of MEP and/or DEP optical transceivers suitable for use in communication systems disclosed herein are described in more detail, e.g., in U.S. patent application Ser. Nos. 14/728,915 and 14/728,919, filed on Jun. 2, 2015, both of which are incorporated herein by reference in their entirety.

As explained in these patent applications, a difference between a MEP optical transceiver and a DEP optical transceiver may be in the number of optical ports. For example, as further explained below, a DEP optical transceiver has two optical input ports and two optical output ports. In contrast, a MEP optical transceiver may have N optical input ports and N optical output ports, where N is any positive integer greater than one. Therefore, a DEP optical transceiver can be considered as one possible embodiment of a MEP optical transceiver, in which N=2. For at least this reason, the term "MEP optical transceiver," as used in this specification and claims, should be construed as a more-general term that covers, inter alia, a DEP optical transceiver.

In an example embodiment, DEP optical transceiver 100 has an electrical input/output (I/O) port 102, optical output ports $104_1$ and $104_2$, and optical input ports $106_1$ and $106_2$. An I/O interface 110 coupled between I/O port 102 and a MAC/PMA module 120 enables DEP optical transceiver 100 to send/receive data to/from external electrical circuits. MAC/PMA module 120 is further coupled, as indicated in FIG. 1, to PMD modules 130 and 150 located in the transmit chain and the receive chain, respectively, of DEP optical transceiver 100. The acronyms MAC, PMA, and PMD stand for media access control, physical medium attachment, and physical medium dependent, respectively.

In an example embodiment, the MAC function of MAC/PMA module 120 enables the addressing and channel-access control mechanisms of the MAC data-communication protocol employed in the corresponding communication system. A person of ordinary skill in the art will appreciate that MAC data-communication protocols define a MAC sub-layer of the data link layer (also often referred to as Layer 2 or L2) of the corresponding communication system. The hardware that implements the MAC functions may also be referred to as the media-access controller.

Together, MAC/PMA module 120 and PMD modules 130 and 150 may be configured to perform one or more of the following PMA/PMD functions:

(A) Clock and Data Recovery (CDR): the CDR function enables extraction of a clock tone from the incoming data signal to allow incoming symbols to be sampled at optimal time(s), e.g. near the middle of a symbol waveform, as well as to provide a reference clock for the digital circuitry configured to process the received signals;

(B) Deserializer/Serializer: this function enables conversion of multiple parallel data streams (e.g., as in four lanes of a 40GBASE-LR4 system) into a single serial data stream, and vice versa; and (C) Physical Coding Sub-layer (PCS): this function enables extraction of protocol-specific data frames from the corresponding bit streams and may include frame re-alignment, removal of alignment data blocks/bits, descrambling, and decoding.

A person of ordinary skill in the art will appreciate that the PCS-processed output can be forwarded to the data link layer.

The receive chain of DEP optical transceiver 100 also includes a path-select switch (PSS) 160 coupled between PMD module 150 and optical input ports $106_1$ and $106_2$ as indicated in FIG. 1. Switch 160 has two possible states, one of which can be controllably selected and enabled based on a control signal 158 received from an external (e.g., network) controller. For example, in a first state of switch 160, PMD module 150 may be electrically coupled to an optical receiver (oRx) $170_1$ and configured to process an electrical signal generated by that optical receiver in response to the optical signal received at optical input port $106_1$. In a second state of switch 160, PMD module 150 is similarly electrically coupled to an optical receiver (oRx) $170_2$ and configured to process an electrical signal generated by that optical receiver in response to the optical signal received at optical input port $106_2$. The presence of switch 160 enables DEP optical transceiver 100 to dynamically select from which one of optical input ports $106_1$ and $106_2$ to accept data. Possible beneficial uses of this particular capability of DEP optical transceiver 100 are described in more detail below in reference to FIGS. 2-5.

The transmit chain of DEP optical transceiver 100 includes optical transmitters (oTx's) $140_1$ and $140_2$ coupled between PMD module 130 and optical output ports $104_1$ and $104_2$ as indicated in FIG. 1. In operation, optical transmitters $140_1$ and $140_2$ generate optical signals carrying two copies of the same data for simultaneous transmission over the optical paths (e.g., optical fibers) coupled to optical output ports $104_1$ and $104_2$. Possible beneficial uses of this particular capability of DEP optical transceiver 100 are also described in more detail below in reference to FIGS. 2-5.

Additional benefits of DEP optical transceiver 100 arise from (i) the shared use of MAC/PMA module 120 and PMD module 130 by optical transmitters $140_1$ and $140_2$ and (ii) the shared use of PMD module 150 and MAC/PMA module 120 by optical receivers $170_1$ and $170_2$. These shared uses may result, for example, in a lower cost of DEP optical transceiver 100 compared to the cost of a functionally comparable optical transceiver composed of two conventional (e.g., single-endpoint, SEP) optical transmitters and two conventional (e.g., SEP) optical receivers.

As used herein, the term "endpoint" refers to a source and/or a sink of an optical signal. In an example embodiment, such an endpoint may include one or more of: (i) an electrical-to-optical (E/O) signal converter; (ii) an optical-to-electrical (O/E) signal converter; (iii) an optical modulator; (iv) an optical signal splitter; (v) an optical signal combiner; (vi) an optical hybrid; (vii) an optical local oscillator; and (viii) and optical and/or electrical signal processor. An example endpoint may be a conventional or MEP optical transceiver, an optical transmitter, or an optical receiver.

In general, a MEP optical transceiver can send and receive optical signals to/from multiple endpoints using the respective optical ports. However, at any given moment in time, a MEP optical transceiver can only accept optically carried data from a single endpoint because the use of a path-select switch (such as switch 160) in effect disables the non-selected optical ports by substantially preventing the corresponding electrical signals from reaching the backend electrical I/O port (such as I/O port 102) of the MEP optical transceiver. As already explained above, different optical ports of the MEP optical transceiver can be selected and enabled at different times. In contrast, a SEP optical transceiver, taken by itself, lacks the capability of selecting and/or switching endpoints and can only communicate with a single endpoint located at the remote end of the optical pathway (e.g., optical fiber) connected to its optical front end.

Figure 2:
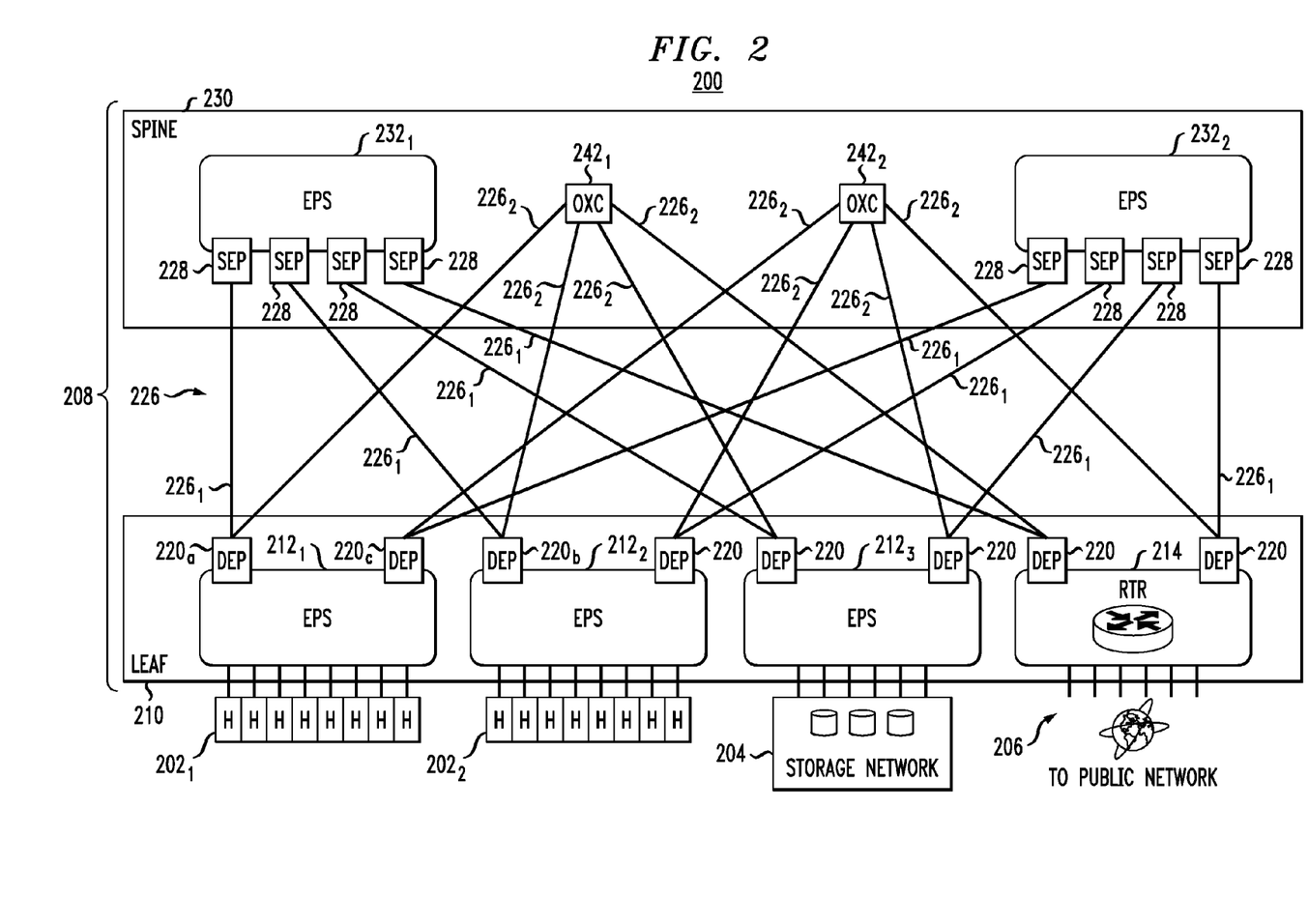
FIG. 2 shows a block diagram of a communication system according to an embodiment of the disclosure.

FIG. 2 shows a block diagram of a communication system 200 according to an embodiment of the disclosure. In some embodiments, system 200 may be used to implement a data center. As used herein, the term "data center" refers to a pool of resources (e.g., computational, storage, communication) interconnected using a communication network. The communication network used in system 200 includes, inter alia, a hybrid packet/circuit-switched network 208 that employs a plurality of DEP optical transceivers 220. In some embodiments, some or each of DEP optical transceivers 220 may be implemented using a corresponding instance (e.g., a nominal copy) of DEP optical transceiver 100 (FIG. 1). In some other embodiments, some or each of DEP optical transceivers 220 may be implemented using a corresponding instance of a MEP optical transceiver built using the DEP/MEP optical transceiver components disclosed in the above-cited in U.S. patent application Ser. Nos. 14/728,915 and 14/728,919.

System 200 is illustratively shown as comprising two clusters, labeled $202_1$ and $202_2$, of network hosts (e.g., servers) H. Each cluster 202 is illustratively shown as having eight network hosts H. However, in various alternative embodiments, the number of network hosts H per cluster 202 can be any positive integer. Alternative embodiments of system 200 may have a number of clusters 202 that is different from that shown in FIG. 2. In an example embodiment, each network host H has a network interface card (NIC) associated with a unique MAC and/or IP (Internet Protocol) address.

System 200 further comprises a storage network 204 that includes a plurality of storage devices, e.g., hard drives, semiconductor and/or optical memories, and the like, that are appropriately connected to one another and also operatively connected to network 208 as indicated in FIG. 2. System 200 also has one or more ports 206 configured to connect network 208 to other (e.g., public) networks, such as the Internet.

In an example embodiment, network 208 is topologically organized using two layers: a leaf layer 210 and a spine layer 230. Leaf layer 210 includes electronic packet switches (EPS's) $212_1$-$212_3$ and a gateway router (RTR) 214. Electronic packet switches $212_1$ and $212_2$ are connected to clusters $202_1$ and $202_2$, respectively. Electronic packet switch $212_3$ is connected to storage network 204. Gateway router 214 is connected to ports 206. Spine layer 230 includes electronic packet switches (EPS's) $232_1$ and $232_2$ and optical cross-connect (OXC) switches $242_1$ and $242_2$. Leaf layer 210 and spine layer 230 are interconnected, as indicated in FIG. 2, using a plurality of DEP optical transceivers 220, a plurality of conventional (e.g., single-endpoint, SEP) optical transceivers 228, and a plurality of optical paths (e.g., optical fibers) 226. In an example embodiment, each optical fiber may support at least one bidirectional link or two opposite unidirectional links.

The plurality of optical paths 226 includes a first subset of optical paths, labeled $226_1$, and a second subset of optical paths, labeled $226_2$. Optical paths $226_1$ connect DEP optical transceivers 220 and SEP optical transceivers 228, as indicated in FIG. 2. Optical paths $226_2$ connect DEP optical transceivers 220 and optical cross-connect switches 242, as further indicated in FIG. 2.

The use of DEP optical transceivers 220 in leaf layer 210 enables network 208 to establish two types of communication links between any pair of network nodes selected from electronic packet switches $212_1$-$212_3$ and gateway router 214. The first type of communication links may be packet-switched and includes one of electronic packet switches $232_1$ and $232_2$. The second type of communication links may be circuit-switched and includes one of optical cross-connect switches $242_1$ and $242_2$.

Note that the designation of the second type of communication links as being "circuit-switched" is merely based on the generally slower switching enabled by modern optical cross-connect switches compared to that of modern electronic packet switches. The relatively high switching speed of modern electronic packet switches enables these switches to route packets by being able to appropriately reconfigure the switch on a packet-by-packet basis, e.g., by reading the packet headers and changing the switch configuration based on the addresses provided in the headers of individual packets. In contrast, the switching speed of modern optical cross-connect switches may not be high enough yet to reconfigure the switch on a packet-by-packet basis, which causes the links established over these switches to be tentatively referred-to herein as being "circuit-switched." A person of ordinary skill in the art will appreciate that the "circuit-switched" designation is used in this specification purely for contrast and comparison of the corresponding two network portions and may be changed without changing the underlying principles of the invention(s) disclosed and claimed herein, should faster optical cross-connect switches become available in the future and are employed in system 200 or a functional equivalent thereof in the functional capacity of optical cross-connect switches $242_1$ and $242_2$.

Figure 3:
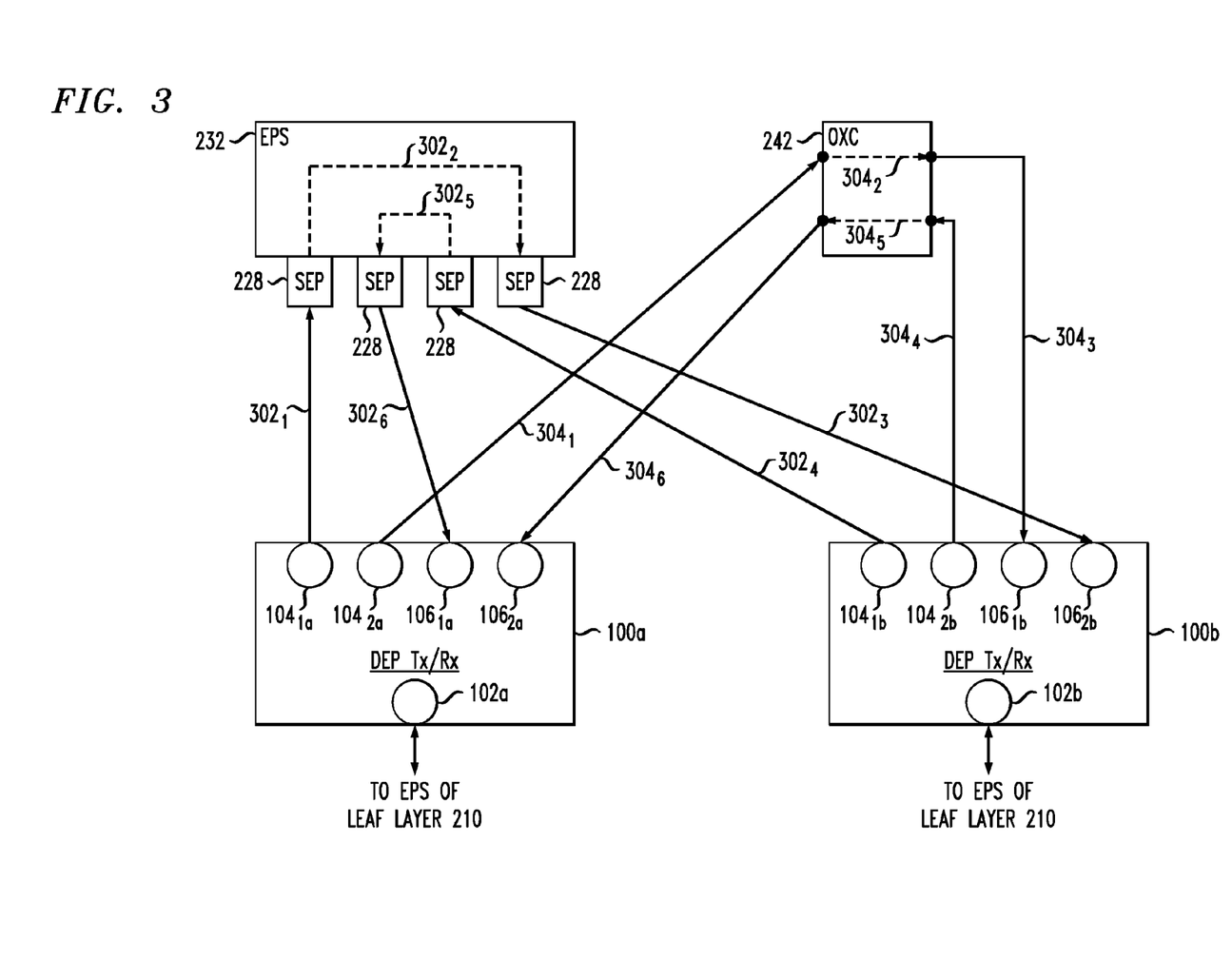
FIG. 3 shows an example of two bidirectional links that can be established in the communication system of FIG. 2 according to an embodiment of the disclosure.

FIG. 3 shows an example of two bidirectional communication links that can be established in network 208 (FIG. 2) according to an embodiment of the disclosure. More specifically, a first bidirectional link 302 shown in FIG. 3 is established between DEP optical transceiver 100a and DEP optical transceiver 100b via an electronic packet switch 232. A second bidirectional link 304 shown in FIG. 3 is established between DEP optical transceiver 100a and DEP optical transceiver 100b via an optical cross-connect switch 242. For example, DEP optical transceivers 100a and 100b may implement DEP optical transceivers 220a and 220b, respectively (see FIG. 2).

Bidirectional link 302 comprises the following sub-links: In the direction from DEP optical transceiver 100a to DEP optical transceiver 100b, link 302 includes sub-links $302_1$, $302_2$, and $302_3$. In the direction from DEP optical transceiver 100b to DEP optical transceiver 100a, link 302 includes sub-links $302_4$, $302_5$, and $302_6$. Sub-links $302_1$, $302_3$, $302_4$, and $302_6$ are established over the corresponding ones of optical paths 226 (see FIG. 2). Sub-links $302_2$ and $302_5$ are established through electronic packet switch 232.

Bidirectional link 304 comprises the following sub-links: In the direction from DEP optical transceiver 100a to DEP optical transceiver 100b, link 304 includes sub-links $304_1$, $304_2$, and $304_3$. In the direction from DEP optical transceiver 100b to DEP optical transceiver 100a, link 304 includes sub-links $304_4$, $304_5$, and $304_6$. Sub-links $304_1$, $304_3$, $304_4$, and $304_6$ are established over the corresponding ones of optical paths 226 (see FIG. 2). Sub-links $304_2$ and $304_5$ are established through optical cross-connect switch 242.

For example, to transmit a data frame from DEP optical transceiver 100a to DEP optical transceiver 100b, links 302 and 304 can be used as follows. A data frame to be transmitted may be received by DEP optical transceiver 100a from an electronic packet switch 212 (also see FIG. 2) at port 102a. The received data frame is then appropriately processed in the transmit chain of DEP optical transceiver 100a (also see FIG. 1), and two copies of the processed data frame are transmitted from optical output ports $104_{1a}$ and $104_{2a}$ over sub-links $302_1$ and $304_1$, respectively. In principle, both copies of the data frame can then arrive at DEP optical transceiver 100b via sub-links $302_3$ and $304_3$, respectively. However, depending on the state of the path-select switch 160 (see FIG. 1), DEP optical transceiver 100b can either accept the frame copy arriving via sub-link $302_3$ or accept the frame copy arriving via sub-link $304_3$, but not both. As a result, at any specific point in time, DEP optical transceiver 100b can receive data frames transmitted either through electronic packet switch 232 or through optical cross-connect switch 242, but not both. For example, at some points in time, DEP optical transceiver 100b may be configured to receive data frames transmitted through electronic packet switch 232. At some other points in time, DEP optical transceiver 100*b* may be configured to receive data frames transmitted through optical cross-connect switch 242.

In an example configuration, a network controller (not explicitly shown in FIG. 3; see, e.g., FIGS. 4A-4D) controls which one of links 302 and 304 is used for the frame delivery to DEP optical transceiver 100*b* by appropriately configuring electronic packet switch 232, optical cross-connect switch 242, and path-select switch 160 of DEP optical transceiver 100*b*. For example, when link 304 is to be used, the network controller may configure electronic packet switch 232 to drop the corresponding packets (e.g., the packets carrying the other copy of the data frame), e.g., by making changes to the forwarding and routing tables of the electronic packet switch. Note that dropping packets does not consume significant resources of electronic packet switch 232 or spine layer 230. When link 302 is to be used, the network controller may configure the path-select switch (PSS) 160 in DEP optical transceiver 100*b* such that the other packet copy that may arrive via optical cross-connect switch 242 is not accepted by the transceiver. In one embodiment, the network controller may be an SDN controller.

Transmission of a data frame from DEP optical transceiver 100*b* to DEP optical transceiver 100*a* over links 302 and 304 may be performed in a similar manner.

FIGS. 4A-4D illustrate several example configurations of network 208 (FIG. 2) according to an embodiment of the disclosure. For brevity and clarity, only a portion 400 of network 208 is shown in FIGS. 4A-4D. Based on the provided description, a person of ordinary skill in the art will be able to devise, without undue experimentation, additional configurations of network 208, including various configurations of the portion(s) of network 208 not shown in FIGS. 4A-4D.

Figure 4A:
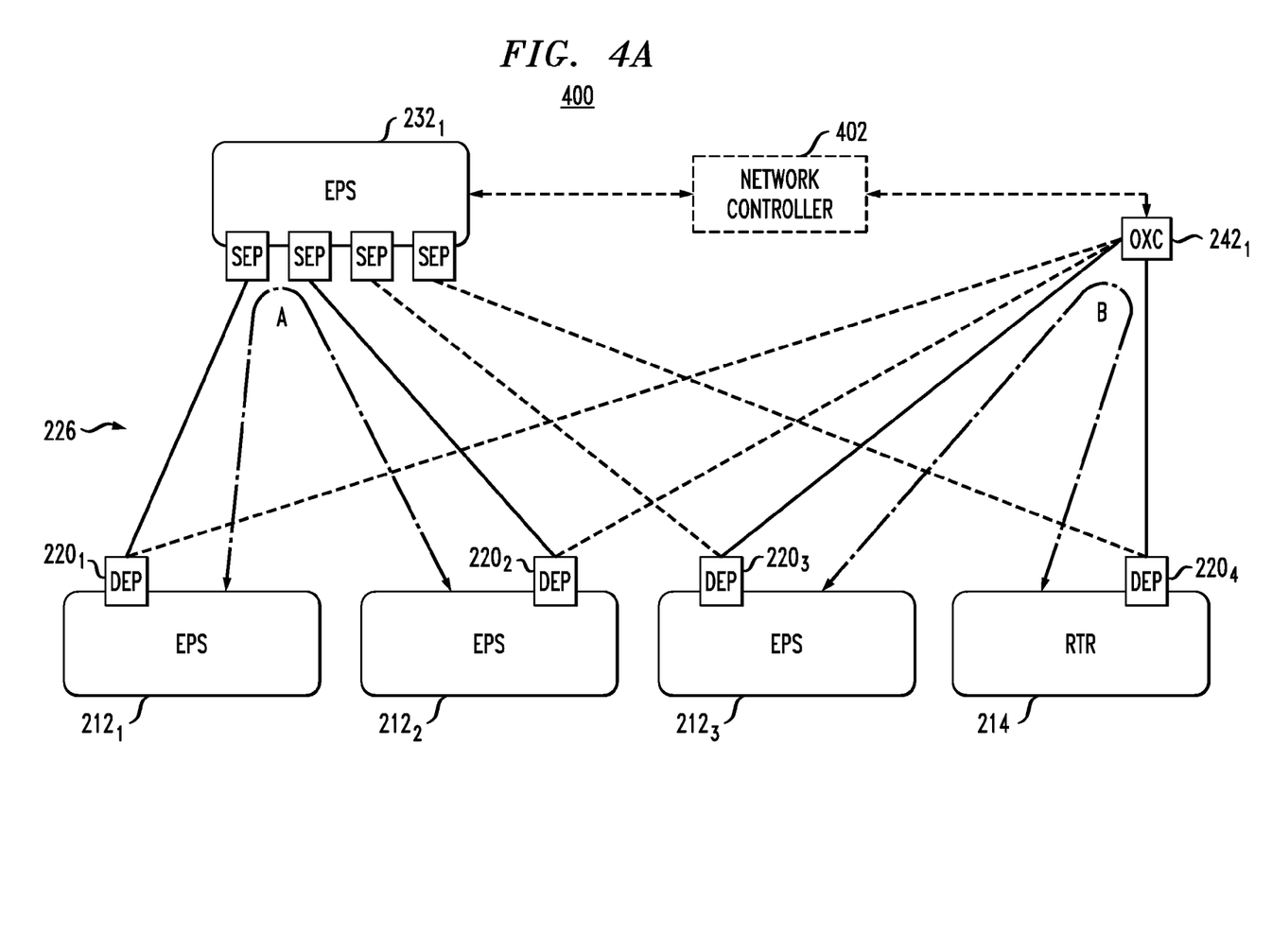
FIGS. 4A-4D illustrate example configurations of the communication system of FIG. 2 according to an embodiment of the disclosure.

In the configuration of FIG. 4A, network portion 400 supports links A and B. Link A is a duplex Layer 2 connection between electronic packet switches $212_1$ and $212_2$ established using DEP optical transceivers $220_1$ and $220_2$. Link B is a duplex Layer 2 connection between electronic packet switches $212_3$ and 214 established using DEP optical transceivers $220_3$ and $220_4$. For example, DEP optical transceivers $220_1$ and $220_2$ are both in the first state, wherein each is transmitting packets to both electronic packet switch $232_1$ and optical cross-connect switch $242_1$, while being configured to accept packets only from electronic packet switch $232_1$, but not from optical cross-connect switch $242_1$, by selecting appropriate states of their path-select switches 160. DEP optical transceivers $220_3$ and $220_4$ are both in the second state, wherein each is transmitting packets to both electronic packet switch $232_1$ and optical cross-connect switch $242_1$, while being configured to accept packets only from optical cross-connect switch $242_1$. In addition, network controller 402 may configure electronic packet switch $232_1$ to drop packets received from DEP optical transceivers $220_3$ and $220_4$.

Figure 4B:
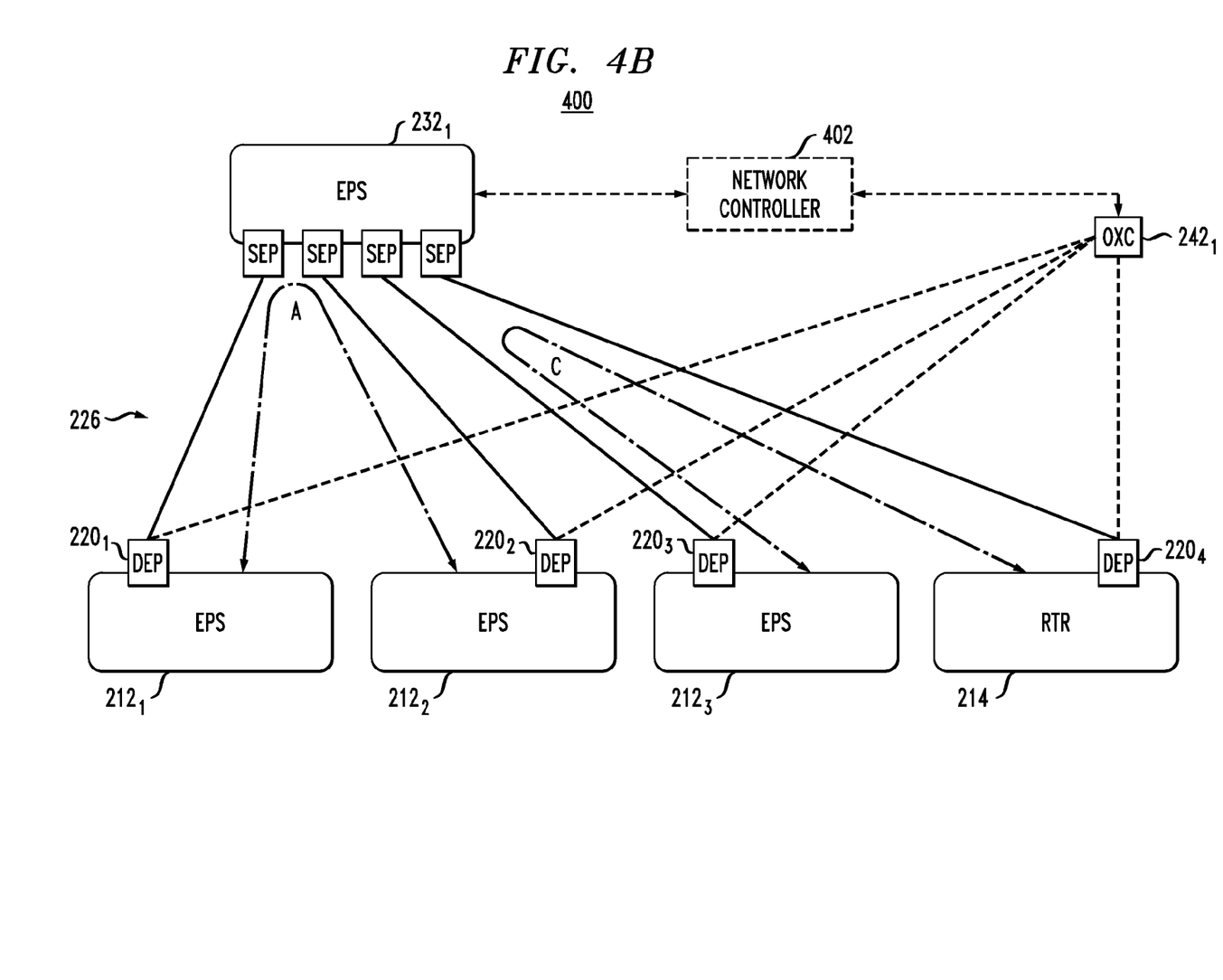
Figure 4C:
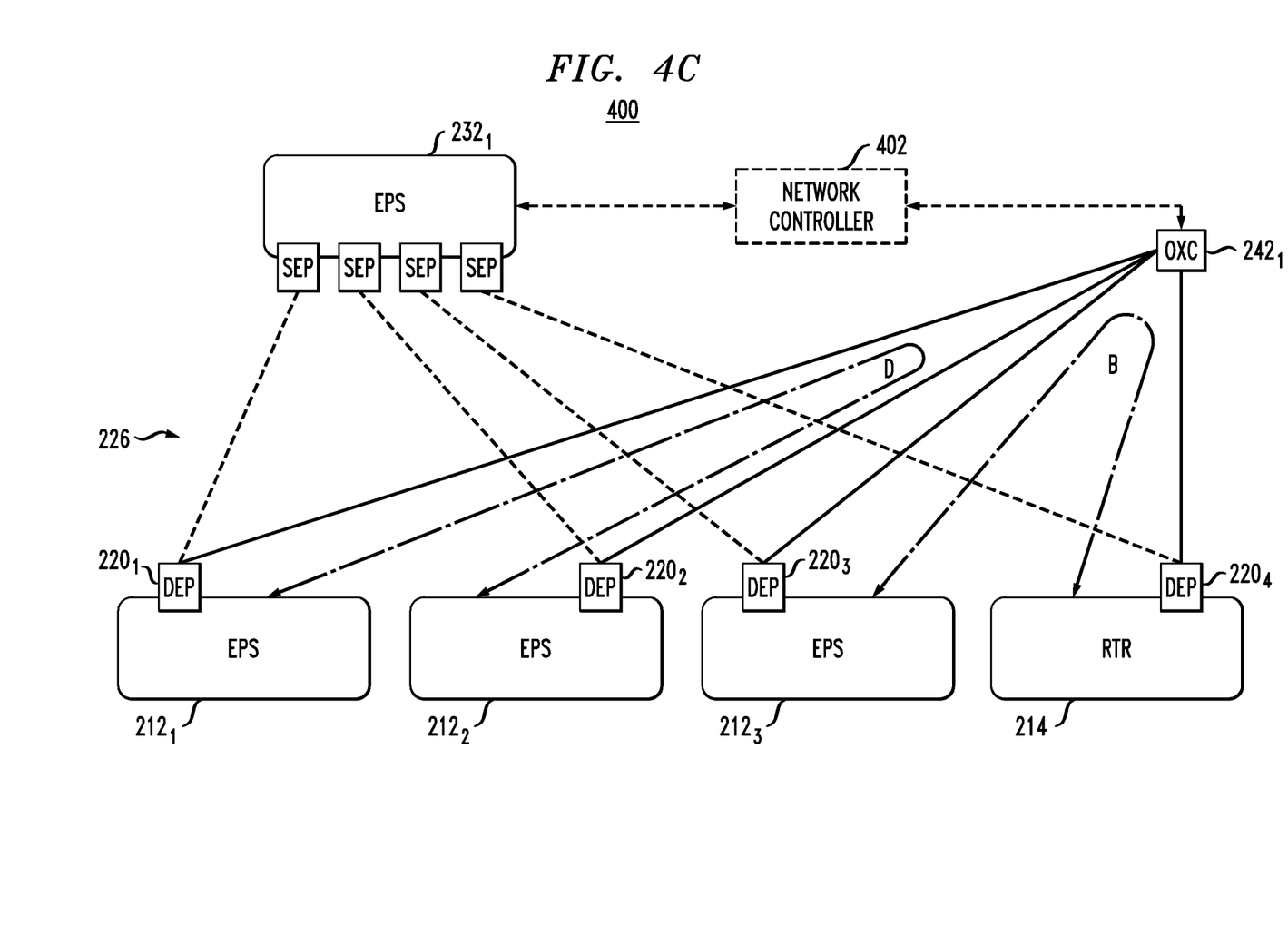

The configuration of FIG. 4B differs from the configuration of FIG. 4A in that Link B is torn down and, instead, Link C is established. Link C is a duplex Layer 2 connection between electronic packet switches $212_3$ and 214 established using DEP optical transceivers $220_3$ and $220_4$, both of which have been reconfigured to operate in the first state. In the first state, both of DEP optical transceivers $220_3$ and $220_4$ are transmitting packets to both electronic packet switch $232_1$ and optical cross-connect switch $242_1$, while being configured to accept packets only from electronic packet switch $232_1$, but not from optical cross-connect switch $242_1$, by selecting appropriate states of their path-select switches 160.

Figure 4D:
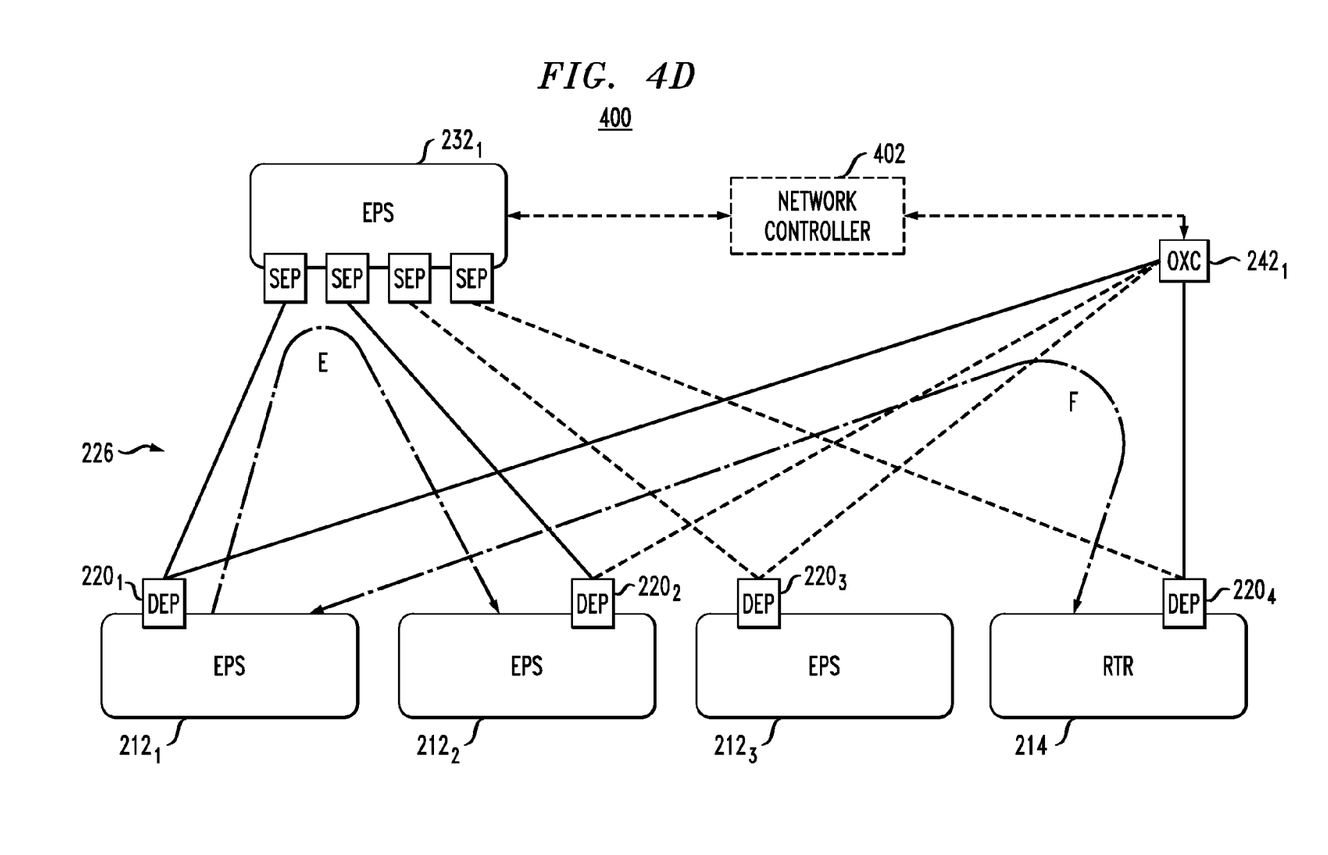

In the configuration of FIG. 4D, network portion 400 supports links E and F. Link E is different from Link A of FIGS. 4A and 4B in that, unlike Link A, Link E is a simplex (half-duplex) Layer 2 connection that supports data transmission from electronic packet switch $212_1$ to electronic packet switch $212_2$, but not from electronic packet switch $212_2$ to electronic packet switch $212_1$. Link F is a duplex Layer 2 connection between electronic packet switches $212_1$ and 214 established using DEP optical transceivers $220_1$ and $220_4$. Due to the fact that DEP optical transceiver $220_1$ is configurable to accept data through only one of its optical input ports (see, e.g., FIG. 1), in this particular configuration, DEP optical transceiver $220_1$ can only accept data from DEP optical transceiver $220_4$, but not from DEP optical transceiver $220_2$, thereby causing Link E to be a simplex connection. DEP transceiver $220_1$ is still able to transmit data frames to both DEP optical transceivers $220_2$ and $220_4$, e.g., using time-division multiplexing.

Figure 5:
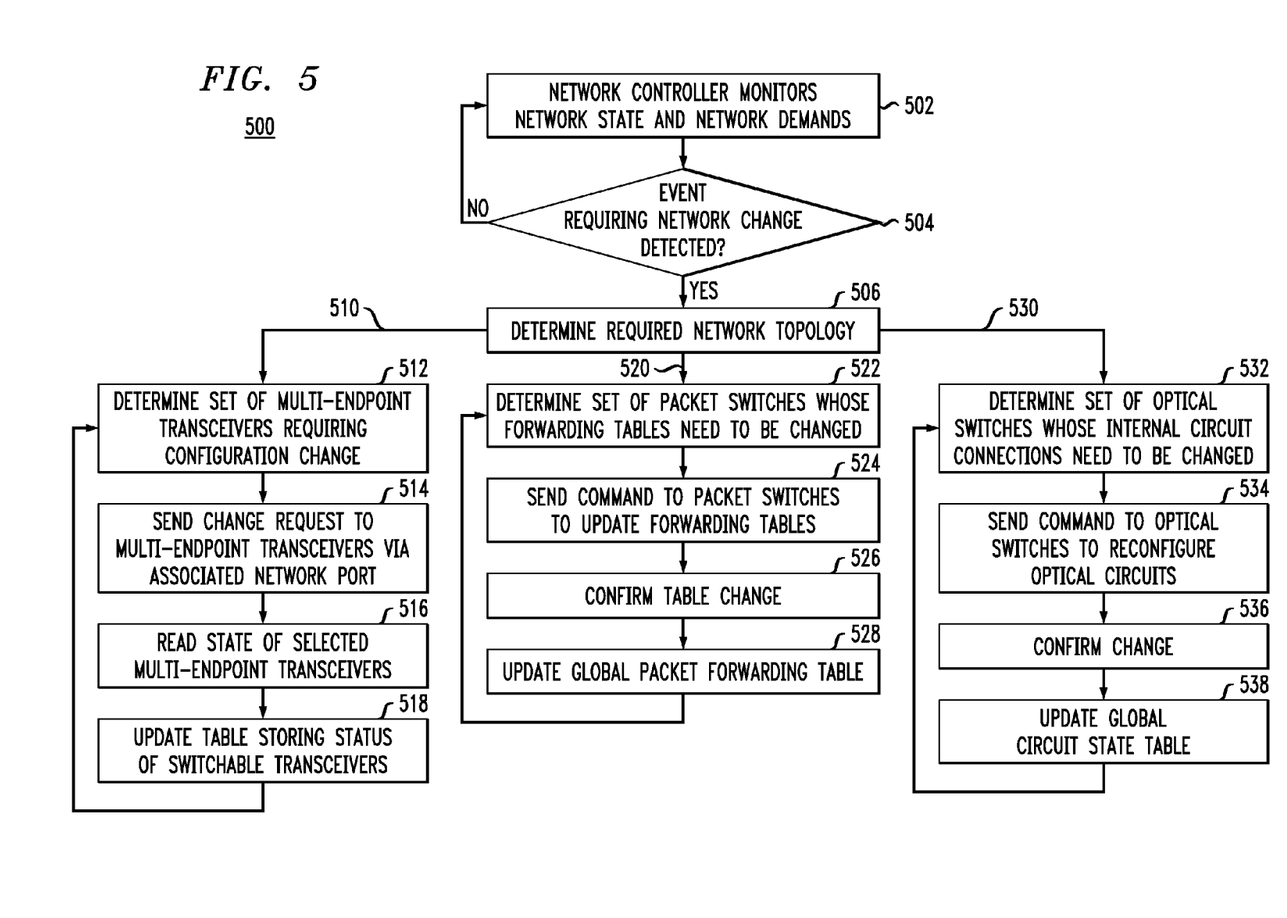
FIG. 5 shows a flowchart of a method of configuring a network of the communication system of FIG. 2 according to an embodiment of the disclosure.

FIG. 5 shows a flowchart of a method 500 of (re)configuring a communication network, e.g., network 208 (FIG. 2), according to an embodiment of the disclosure.

At step 502, a network controller, e.g., network controller 402 (FIG. 4), is configured to monitor the state of and/or traffic demands in system 200 and network 208.

If an event requiring a configuration change in network 208 is detected at step 504, then the processing of method 500 is directed to step 506. Otherwise, the processing of method 500 is looped back to step 502.

At step 506, the network controller is configured to determine the configuration changes (e.g., changes in the effective topology) of network 208 prompted by the event detected at step 504. The determined configuration changes are then effected by executing the processing steps in one or more of processing branches 510, 520, and 530.

Referring to the processing implemented in processing branch 510, at step 512, the network controller is configured to identify a set of MEP optical transceivers, e.g., DEP optical transceivers 220 (FIG. 2), corresponding to the configuration changes determined at step 506. At step 514, the network controller is configured to send a change request to the MEP optical transceivers identified at step 512 via the associated network port(s). At step 516, the network controller is configured to read out the state(s) of the MEP optical transceivers whose configuration changes were requested at step 514, after said configuration changes have been effected. At step 518, the network controller is configured to update a table that stores the current status of the MEP optical transceivers in network 208. After step 518, the processing of processing branch 510 is looped back to step 512.

Referring to the processing implemented in processing branch 520, at step 522, the network controller is configured to identify a set of electronic packet switches, e.g., EPS's 232 (FIG. 2), corresponding to the configuration changes determined at step 506. At step 524, the network controller is configured to send a command to the electronic packet switches identified at step 522 to appropriately change or update their forwarding tables. At step 526, the network controller is configured to confirm the table changes requested at step 524, after said table changes have been made. At step 528, the network controller is configured to update the global packet-forwarding table of network 208 based on the changes of steps 524 and 526. After step 528, the processing of processing branch 520 is looped back to step 522.

Referring to the processing implemented in processing branch 530, at step 532, the network controller is configured to identify optical cross-connect switches, e.g., OXC's 242 (FIG. 2), corresponding to the configuration changes determined at step 506. At step 534, the network controller is configured to send a command to the optical cross-connect switches identified at step 532 to appropriately reconfigure their optical circuits. At step 536, the network controller is configured to confirm the circuit-configuration changes requested at step 534, after said changes have been made. At step 538, the network controller is configured to update the global circuit-state table in network 208 based on the changes of steps 534 and 536. After step 538, the processing of processing branch 530 is looped back to step 532.

Some embodiments disclosed above in reference to FIGS. 2-5 may advantageously be used to alleviate problems associated with the so called "elephant flows." As used herein, the term "elephant flow" refers to a flow of data packets between a source node and a destination node that is relatively long-lived and transfers a relatively large amount of data and/or a relatively large number of data packets. Elephant flows are encountered, e.g., in data centers, wherein the majority of flows are relatively short in duration and small in volume and, as such, are sometimes referred to as "mice flows." However, the majority of packets transmitted over a data-center network, e.g., functionally similar to network 208 (FIG. 2), still belong to the few elephant flows carried therethrough. Mice flows are typically associated with bursty, latency-sensitive applications. In contrast, elephant flows tend to implement large data transfers for which the adequately large throughput is more important than latency.

One problem with elephant flows is that they tend to fill up the network and switch buffers to their maximum capacity, end to end. The resulting buffer overflow may then cause a disadvantageously large queuing delay to any flows that might share buffers with elephant flows. Furthermore, the burstiness of mice flows tends to limit the available routing options because adaptive routing techniques cannot be used very effectively when both mice and elephant flows are present in the network at the same time.

These and some other related problems in the prior art may be addressed using certain embodiments disclosed herein, e.g., by routing elephant flows through the circuit-switched portion (e.g., including OXC's 242, FIG. 2) of the network while configuring the packet-switched portion (e.g., including EPS's 232, FIG. 2) to drop the elephant flows altogether. As a result, network buffers are not overwhelmed and tend to operate at intended fill-up levels, thereby providing a relatively low queuing delay for mice flows.

According to an example embodiment disclosed above in reference to FIGS. 1-5, provided is an apparatus (e.g., 200, FIG. 2) comprising: a plurality of multiple-endpoint (MEP) optical transceivers (e.g., 220, FIG. 2), each optically coupled to a respective optical path of a first plurality of optical paths (e.g., 226₁, FIG. 2) and to a respective optical path of a second plurality of optical paths (e.g., 226₂, FIG. 2); a first-layer (e.g., 230, FIG. 2) electronic packet switch (e.g., 232₁, FIG. 2) coupled to the plurality of MEP optical transceivers via the first plurality of optical paths; and an optical cross-connect switch (e.g., 242₁, FIG. 2) coupled to the plurality of MEP optical transceivers via the second plurality of optical paths. The apparatus is configured to transmit data from any one of the MEP optical transceivers to any other of the MEP optical transceivers via a respective communication link (e.g., one of A-F, FIGS. 4A-4D) that is configurable to include a selected one of the first-layer electronic packet switch and the optical cross-connect switch.

In some embodiments of the above apparatus, the apparatus further comprises a plurality of second-layer (e.g., 210, FIG. 2) electronic packet switches (e.g., 212, FIG. 2), wherein each of the plurality of MEP optical transceivers is electrically connected (e.g., via 102, FIG. 1) to a respective one of the second-layer electronic packet switches.

In some embodiments of any of the above apparatus, the apparatus is configured to transmit data from any one of the second-layer electronic packet switches to any other of the second-layer electronic packet switches using a respective pair of the MEP optical transceivers (e.g., $220_i$ and $220_j$, $i \neq j$, $i=1, 2, 3, 4$, $j=1, 2, 3, 4$; FIGS. 4A-4D) and the respective communication link.

In some embodiments of any of the above apparatus, the apparatus further comprises: a first cluster (e.g., 202₁, FIG. 2) of network hosts (e.g., H, FIG. 2) coupled to a first second-layer electronic packet switch (e.g., 212₁, FIG. 2); and a second cluster (e.g., 202₂, FIG. 2) of network hosts (e.g., H, FIG. 2) coupled to a second second-layer electronic packet switch (e.g., 212₂, FIG. 2). The apparatus is configured to transmit data between a network host of the first cluster and a network host of the second cluster using a respective pair of the MEP optical transceivers (e.g., $220_i$ and $220_j$, $i \neq j$, $i=1, 2, 3, 4$, $j=1, 2, 3, 4$; FIGS. 4A-4D) and the respective communication link.

In some embodiments of any of the above apparatus, the apparatus further comprises an electronic controller (e.g., 402, FIGS. 4A-4D) operatively coupled to the first-layer electronic packet switch and the optical cross-connect switch to configure the selected one of the first-layer electronic packet switch and the optical cross-connect switch to support said respective communication link.

In some embodiments of any of the above apparatus, the electronic controller is configured to change the selected one of the first-layer electronic packet switch and the optical cross-connect switch in the respective communication link based on data volume to be transmitted between the respective pair of the MEP optical transceivers.

In some embodiments of any of the above apparatus, at least some MEP optical transceivers of the plurality of MEP optical transceivers comprise respective dual-endpoint (DEP) optical transceivers (e.g., 100, FIG. 1).

In some embodiments of any of the above apparatus, each of the MEP transceivers (e.g., 100, FIG. 1) is configured to: transmit a first copy of data to be transmitted via the respective optical path of the first plurality of optical paths; and transmit a second copy of the data to be transmitted via the respective optical path of the second plurality of optical paths.

In some embodiments of any of the above apparatus, the respective path-select switch is configured to cause the MEP transceiver not to accept data received via the respective optical path that is not the selected one.

In some embodiments of any of the above apparatus, each of the MEP transceivers comprises a respective path-select switch (e.g., 160, FIG. 1) configurable to cause the MEP transceiver to accept data received via a selected one of (i) the respective optical path of the first plurality of optical paths and (ii) the respective optical path of the second plurality of optical paths.

In some embodiments of any of the above apparatus, the apparatus further comprises a plurality of single-endpoint (SEP) optical transceivers (e.g., 228, FIG. 2), each electrically connected the first-layer electronic packet switch and optically coupled to a corresponding one of the MEP optical transceivers via the respective optical path of the first plurality of optical paths.

In some embodiments of any of the above apparatus, when the first-layer electronic packet switch is the selected one, the respective communication link further includes (i) a first SEP optical transceiver of the plurality of SEP optical transceivers and (ii) a second SEP optical transceiver of the plurality of SEP optical transceivers; and the first-layer electronic packet switch is configured to electrically route data to be transmitted via the respective communication link between the first SEP optical transceiver and the second SEP optical transceiver.

In some embodiments of any of the above apparatus, the apparatus further comprises: an additional first-layer electronic packet switch (e.g., $232_2$, FIG. 2) coupled to the plurality of MEP optical transceivers via the first plurality of optical paths; and an additional optical cross-connect switch (e.g., $242_2$, FIG. 2) coupled to the plurality of MEP optical transceivers via the second plurality of optical paths.

In some embodiments of any of the above apparatus, the plurality of MEP optical transceivers includes a first subset of MEP optical transceivers and a second subset of MEP optical transceivers; the apparatus is configured to transmit data from any one of the MEP optical transceivers of the first subset to any other of the MEP optical transceivers of the first subset via a respective communication link that is configurable to include a selected one of the first-layer electronic packet switch and the optical cross-connect switch; and the apparatus is further configured to transmit data from any one of the MEP optical transceivers of the second subset to any other of the MEP optical transceivers of the second subset via another respective communication link that is configurable to include a selected one of the additional first-layer electronic packet switch and the additional optical cross-connect switch.

In some embodiments of any of the above apparatus, the apparatus further comprises a plurality of second-layer (e.g., 210, FIG. 2) electronic packet switches (e.g., 212, FIG. 2), wherein each of the plurality of MEP optical transceivers is electrically connected (e.g., via 102, FIG. 1) to a respective one of the second-layer electronic packet switches.

In some embodiments of any of the above apparatus, at least one of the second-layer electronic packet switches (e.g., $212_1$, FIG. 2) is electrically connected to a respective MEP optical transceiver (e.g., 220a, FIG. 2) of the first subset and a respective MEP optical transceiver (e.g., 220c, FIG. 2) of the second subset.

In some embodiments of any of the above apparatus, the first subset of MEP optical transceivers and the second subset of MEP optical transceivers have no MEP optical transceivers in common.

In some embodiments of any of the above apparatus, neither of the first-layer electronic packet switch and the additional first-layer electronic packet switch is configurable to transmit data between a MEP optical transceiver of the first subset and a MEP optical transceiver of the second subset.

In some embodiments of any of the above apparatus, neither of the optical cross-connect switch and the additional optical cross-connect switch is configurable to transmit data between a MEP optical transceiver of the first subset and a MEP optical transceiver of the second subset.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, processor, or controller, the machine becomes an apparatus for practicing the corresponding embodiment of the claimed invention(s).

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. An apparatus comprising:
a plurality of multiple-endpoint (MEP) optical transceivers, each optically coupled to a respective optical path of a first plurality of optical paths and to a respective optical path of a second plurality of optical paths;
a first-layer electronic packet switch coupled to the plurality of MEP optical transceivers via the first plurality of optical paths; and
an optical cross-connect switch coupled to the plurality of MEP optical transceivers via the second plurality of optical paths; and
wherein the apparatus is configured to transmit data from any one of the MEP optical transceivers to any other of the MEP optical transceivers via a respective communication link that is configurable to include a selected one of the first-layer electronic packet switch and the optical cross-connect switch.

2. The apparatus of claim 1, further comprising a plurality of second-layer electronic packet switches, wherein each of the plurality of MEP optical transceivers is electrically connected to a respective one of the second-layer electronic packet switches.

3. The apparatus of claim 1, further comprising an electronic controller operatively coupled to the first-layer electronic packet switch and the optical cross-connect switch to configure the selected one of the first-layer electronic packet switch and the optical cross-connect switch to support said respective communication link.

4. The apparatus of claim 1, wherein at least some MEP optical transceivers of the plurality of MEP optical transceivers comprise respective dual-endpoint (DEP) optical transceivers.

5. The apparatus of claim 1, wherein each of the MEP optical transceivers is configured to:
transmit a first copy of data to be transmitted via the respective optical path of the first plurality of optical paths; and
transmit a second copy of the data to be transmitted via the respective optical path of the second plurality of optical paths.

6. The apparatus of claim 1, wherein each of the MEP optical transceivers comprises a respective path-select switch configurable to cause the MEP optical transceiver to accept data received via a selected one of (i) the respective optical path of the first plurality of optical paths and (ii) the respective optical path of the second plurality of optical paths.

7. The apparatus of claim 1, further comprising a plurality of single-endpoint (SEP) optical transceivers, each electrically connected the first-layer electronic packet switch and optically coupled to a corresponding one of the MEP optical transceivers via the respective optical path of the first plurality of optical paths.

8. The apparatus of claim 1, further comprising:
an additional first-layer electronic packet switch coupled to the plurality of MEP optical transceivers via the first plurality of optical paths; and
an additional optical cross-connect switch coupled to the plurality of MEP optical transceivers via the second plurality of optical paths.

9. The apparatus of claim 2, wherein the apparatus is configured to transmit data from any one of the second-layer electronic packet switches to any other of the second-layer electronic packet switches using a respective pair of the MEP optical transceivers and the respective communication link.

10. The apparatus of claim 2, further comprising:
a first cluster of network hosts coupled to a first second-layer electronic packet switch; and
a second cluster of network hosts coupled to a second second-layer electronic packet switch; and
wherein the apparatus is configured to transmit data between a network host of the first cluster and a network host of the second cluster using a respective pair of the MEP optical transceivers and the respective communication link.

11. The apparatus of claim 3, wherein the electronic controller is configured to change the selected one of the first-layer electronic packet switch and the optical cross-connect switch in the respective communication link based on data volume to be transmitted between the respective pair of the MEP optical transceivers.

12. The apparatus of claim 5, wherein each of the MEP optical transceivers comprises a respective path-select switch configurable to cause the MEP optical transceiver to accept data received via a selected one of (i) the respective optical path of the first plurality of optical paths and (ii) the respective optical path of the second plurality of optical paths.

13. The apparatus of claim 7, wherein:
when the first-layer electronic packet switch is the selected one, the respective communication link further includes (i) a first SEP optical transceiver of the plurality of SEP optical transceivers and (ii) a second SEP optical transceiver of the plurality of SEP optical transceivers; and
the first-layer electronic packet switch is configured to electrically route data to be transmitted via the respective communication link between the first SEP optical transceiver and the second SEP optical transceiver.

14. The apparatus of claim 8, wherein:
the plurality of MEP optical transceivers includes a first subset of MEP optical transceivers and a second subset of MEP optical transceivers;
the apparatus is configured to transmit data from any one of the MEP optical transceivers of the first subset to any other of the MEP optical transceivers of the first subset via a respective communication link that is configurable to include a selected one of the first-layer electronic packet switch and the optical cross-connect switch; and
the apparatus is further configured to transmit data from any one of the MEP optical transceivers of the second subset to any other of the MEP optical transceivers of the second subset via another respective communication link that is configurable to include a selected one of the additional first-layer electronic packet switch and the additional optical cross-connect switch.

15. The apparatus of claim 12, wherein the respective path-select switch is configured to cause the MEP optical transceiver not to accept data received via the respective optical path that is not the selected one.

16. The apparatus of claim 14,
further comprising a plurality of second-layer electronic packet switches, wherein each of the plurality of MEP optical transceivers is electrically connected to a respective one of the second-layer electronic packet switches; and
wherein at least one of the second-layer electronic packet switches is electrically connected to a respective MEP optical transceiver of the first subset and a respective MEP optical transceiver of the second subset.

17. The apparatus of claim 14, wherein the first subset of MEP optical transceivers and the second subset of MEP optical transceivers have no MEP optical transceivers in common.

18. The apparatus of claim 14, wherein neither of the first-layer electronic packet switch and the additional first-layer electronic packet switch is configurable to transmit data between a MEP optical transceiver of the first subset and a MEP optical transceiver of the second subset.

19. The apparatus of claim 14, wherein neither of the optical cross-connect switch and the additional optical cross-connect switch is configurable to transmit data between a MEP optical transceiver of the first subset and a MEP optical transceiver of the second subset.

20. The apparatus of claim 18, wherein neither of the optical cross-connect switch and the additional optical cross-connect switch is configurable to transmit data between a MEP optical transceiver of the first subset and a MEP optical transceiver of the second subset.

\* \* \* \* \*